US005928594A

United States Patent [19]
Foster

[11] Patent Number: 5,928,594
[45] Date of Patent: Jul. 27, 1999

[54] DISPENSER WITH IMPROVED BOTTLE CONNECTION AND METHOD OF MAKING SAME

[75] Inventor: Donald D. Foster, St. Charles, Mo.

[73] Assignee: Continental Sprayers International, Inc., St. Peters, Mo.

[21] Appl. No.: 08/868,460

[22] Filed: Jun. 3, 1997

Related U.S. Application Data

[62] Division of application No. 08/659,020, Jun. 4, 1996, Pat. No. 5,806,724.

[51] Int. Cl.$^{6}$ .......... B29C 31/10; B29C 45/16
[52] U.S. Cl. .......... 264/255; 264/250; 264/328.8
[58] Field of Search .......... 264/255, 328.8, 264/250; 222/383.1, 382, 341; 239/333

[56] References Cited

U.S. PATENT DOCUMENTS

| | | | |
|---|---|---|---|
| 3,656,645 | 4/1972 | Fontenelli . | |
| 3,785,532 | 1/1974 | Cooprider . | |
| 4,059,198 | 11/1977 | Mumford | 215/222 |
| 4,304,749 | 12/1981 | Bauer | 264/263 |
| 4,609,114 | 9/1986 | Roy | 215/220 |
| 4,728,009 | 3/1988 | Schmidt . | |
| 4,781,311 | 11/1988 | Dunning et al. | 222/383.1 |
| 4,803,031 | 2/1989 | Ochs et al. | 264/255 |
| 4,819,835 | 4/1989 | Tasaki . | |
| 5,169,032 | 12/1992 | Steijns et al. . | |
| 5,169,033 | 12/1992 | Shay . | |
| 5,238,152 | 8/1993 | Maas et al. . | |
| 5,257,724 | 11/1993 | Steijns . | |
| 5,297,701 | 3/1994 | Steijns et al. . | |
| 5,318,206 | 6/1994 | Maas et al. . | |
| 5,449,078 | 9/1995 | Akers . | |
| 5,551,582 | 9/1996 | Robinson . | |

*Primary Examiner*—Catherine Timm
*Assistant Examiner*—Suzanne E. Mason
*Attorney, Agent, or Firm*—Howell & Haferkamp, L.C.

[57] ABSTRACT

A manually operated reciprocating fluid pump configured to be secured to a container's mouth comprises a dispenser body and a lower member connected to the dispenser body. The dispenser body has a pump mechanism, a discharge port, and a discharge liquid flow path providing fluid communication between the pump mechanism and discharge port. The lower member is of a molded one piece construction and comprises a housing portion and a seal portion. The housing portion has an intake port adapted for fluid communication with liquid contained in the container. The housing portion at least in part defines an intake liquid flow path providing fluid communication between the intake port and the pump mechanism. The seal portion is engageable with the container and is shaped and configured for providing a fluid-tight seal between the lower member and the mouth of the container. The seal portion is of a first material and the housing portion is of a second material different from the first material. The first material cooperates with the second material in a molded configuration to maintain securement of the seal portion to the housing portion.

4 Claims, 8 Drawing Sheets

DISPENSER WITH IMPROVED BOTTLE CONNECTION AND METHOD OF MAKING SAME

This is a divisional of application Ser. No. 08/659,020 filed on Jun. 4, 1996, now U.S. Pat. No. 5,806,724.

BACKGROUND OF THE INVENTION

This invention relates to manually-operated reciprocating fluid pumps such as pump-type trigger sprayers.

A trigger sprayer typically includes a dispenser body, a closure cap connected to the dispenser body for securing the trigger sprayer to the neck of a container (or bottle), a dip tube depending from the dispenser body and configured for extending through a mouth (i.e., opening) in the neck of the bottle, and a gasket (or bottle seal) for preventing leakage between the closure cap and the mouth of the container when the closure cap closes the mouth of the container.

The dispenser body has a manually operated pump which draws liquid up the dip tube from the bottle and dispenses it through a nozzle via a liquid flow path in the dispenser body. A priming check valve within the liquid flow path and upstream of the pump permits fluid flow from the container to the pump, but checks fluid flow from the pump back to the container. Another check valve within the liquid flow path and downstream of the pump permits fluid flow from the pump to the nozzle, but checks fluid flow from the nozzle to the pump.

A concern associated with such a trigger sprayer is the cost of manufacture. A typical trigger sprayer is of relatively low cost. However, trigger sprayers with more pieces generally cost slightly more to produce than trigger sprayers with fewer pieces. Millions of trigger sprayers are sold each year for use in dispensing a wide variety of products. Because of the large volumes sold, a savings of even one cent per trigger sprayer is significant.

To reduce the number of trigger sprayer pieces, the closure cap and bottle seal of some conventional trigger sprayers are molded as integral portions of a housing of the trigger sprayer and are made of the same rigid material as the sprayer housing. Because the integral closure cap cannot rotate relative to the trigger sprayer housing, the skirt of the cap does not have a threaded inner surface for engaging a thread on the neck of the bottle. Rather, two diametrically opposite lugs extend radially inwardly from the skirt of the cap and are configured for a snap fit engagement with two diametrically opposite bayonet provisions on the neck of the bottle. The bottle seal of such sprayer is shaped to sealingly engage an inner surface (e.g., inner circumference) of the mouth of the bottle.

A concern with such bayonet-type bottle connection is that the closure cap tends to rock on the bayonet provisions of the bottle. This rocking may result in the bottle seal becoming unsealed from the mouth of the bottle thereby allowing inadvertent leakage of the liquid contents of the bottle between the bottle seal and bottle.

Another concern is that bottles used with trigger sprayers having generally rigid, integral seals are generally more costly to manufacture than bottles used with resilient elastomeric gaskets. The inner circumferential surface of the neck of such a bottle must be made with relatively close tolerances because the generally rigid seal does not readily conform to the shape of this surface. The requirement of close tolerances increases the cost of manufacturing the bottle.

SUMMARY OF THE INVENTION

Among the several objects of the present invention may be noted the provision of an improved fluid pump; the provision of such a fluid pump which has a minimum number of parts; the provision of such a fluid pump which is relatively low in cost; the provision of such a trigger sprayer having a bottle seal and closure cap of an integral molded construction, but with the seal being configured to readily conform to the shape of the inner surface of a neck of the bottle to provide a fluid tight seal; the provision of such a trigger sprayer and bottle having a bayonet-type connection configured for minimizing rocking of the closure cap relative to the bottle and for minimizing fluid leakage between the closure cap and bottle; the provision of such a fluid pump which is of relatively simple construction; and the provision of a method of making such a trigger sprayer.

Generally, a manually operated reciprocating fluid pump of the present invention is adapted to be secured to a container's mouth. The fluid pump comprises a dispenser body and a lower member connected to the dispenser body. The dispenser body has a pump mechanism, a discharge port, and a discharge liquid flow path providing fluid communication between the pump mechanism and discharge port. The lower member is of a molded one piece construction and comprises a housing portion and a seal portion. The housing portion has an intake port adapted for fluid communication with liquid contained in the container. The housing portion at least in part defines an intake liquid flow path providing fluid communication between the intake port and the pump mechanism. The seal portion is engageable with the container and is shaped and configured for providing a fluid-tight seal between the lower member and the mouth of the container. The seal portion is of a first material and the housing portion is of a second material different from the first material. The first material cooperates with the second material in a molded configuration to maintain securement of the seal portion to the housing portion.

In another aspect of the present invention, a dispenser comprises a container for containing fluid to be dispensed and a manually operated reciprocating fluid pump adapted to be secured to the container. The fluid pump includes a pump mechanism, an intake port adapted for fluid communication with liquid contained in the container, an intake liquid flow path providing fluid communication between the intake port and the pump mechanism, a discharge port, a discharge liquid flow path providing fluid communication between the pump mechanism and discharge port, a closure cap portion configured for releasably securing the fluid pump to the container, and a seal portion engageable with the container and shaped and configured for providing a fluid-tight seal between the fluid pump and the container. The closure cap comprises a generally annular-shaped skirt and at least three lugs extending generally radially inwardly from an inside surface of the skirt. The container includes a neck having a mouth therein for passage therethrough of liquid in the container. The container further includes at least three bayonet provisions on an outer surface of the neck for matably receiving the lugs of the closure cap. The bayonet provisions and the lugs are shaped and configured to releasably lock the skirt of the closure cap to the neck of the container.

Another aspect of the present invention is a method of making a one-piece lower member of a manually operated reciprocating fluid pump adapted to be secured to a container's mouth. The lower member is configured to be connected to a dispenser body of the fluid pump. The dispenser body has a pump mechanism, a discharge port, and a discharge liquid flow path providing fluid communication between the pump mechanism and discharge port. The lower member comprises a housing portion and a seal portion. The housing portion has an intake port adapted for fluid communication with liquid contained in the container. The housing portion at least in part defines an intake liquid flow path providing fluid communication between the intake port and the pump mechanism when the lower member is connected to the dispenser body. The seal portion is engageable with the container and is shaped and configured for providing a fluid-tight seal between the lower member and the mouth of the container. The method comprises injecting a first liquid polymeric material into a first portion of a mold. The first portion of the mold is shaped to form the seal portion of the lower member. A second liquid polymeric material is injected into a second portion of the mold. The second portion of the mold is shaped to form the housing portion of the lower member. The first and second polymeric materials have different compositions. Part of the first material interfaces with part of the second material in the mold. Solidification of the first and second materials in the mold is facilitated to form a solid one piece member constituting the lower member. The solid one piece member is removed from the mold.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
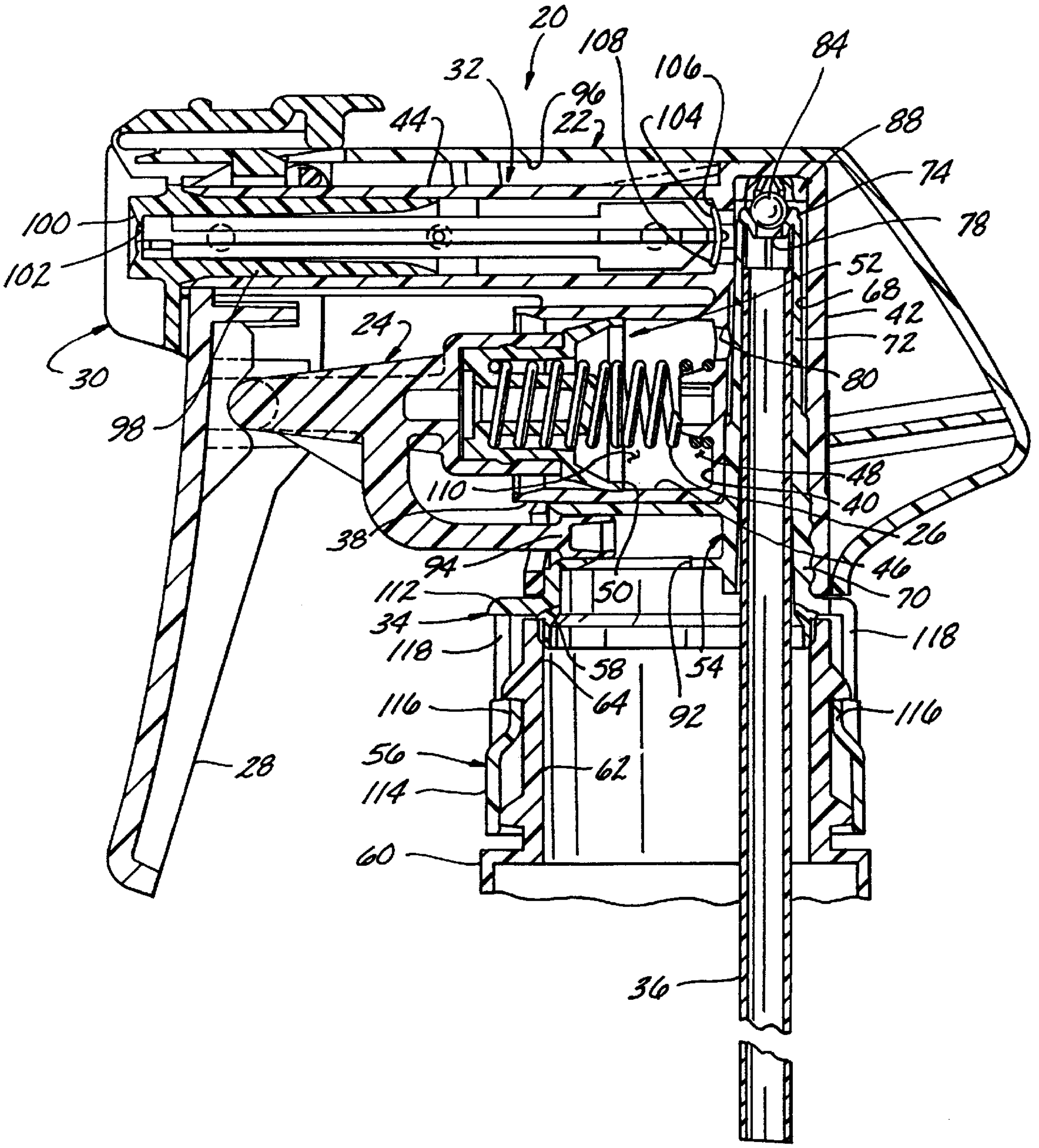
FIG. 1 is a fragmented side elevational view, in section, of a trigger sprayer and bottle (container) of the present invention.
Figure 2:
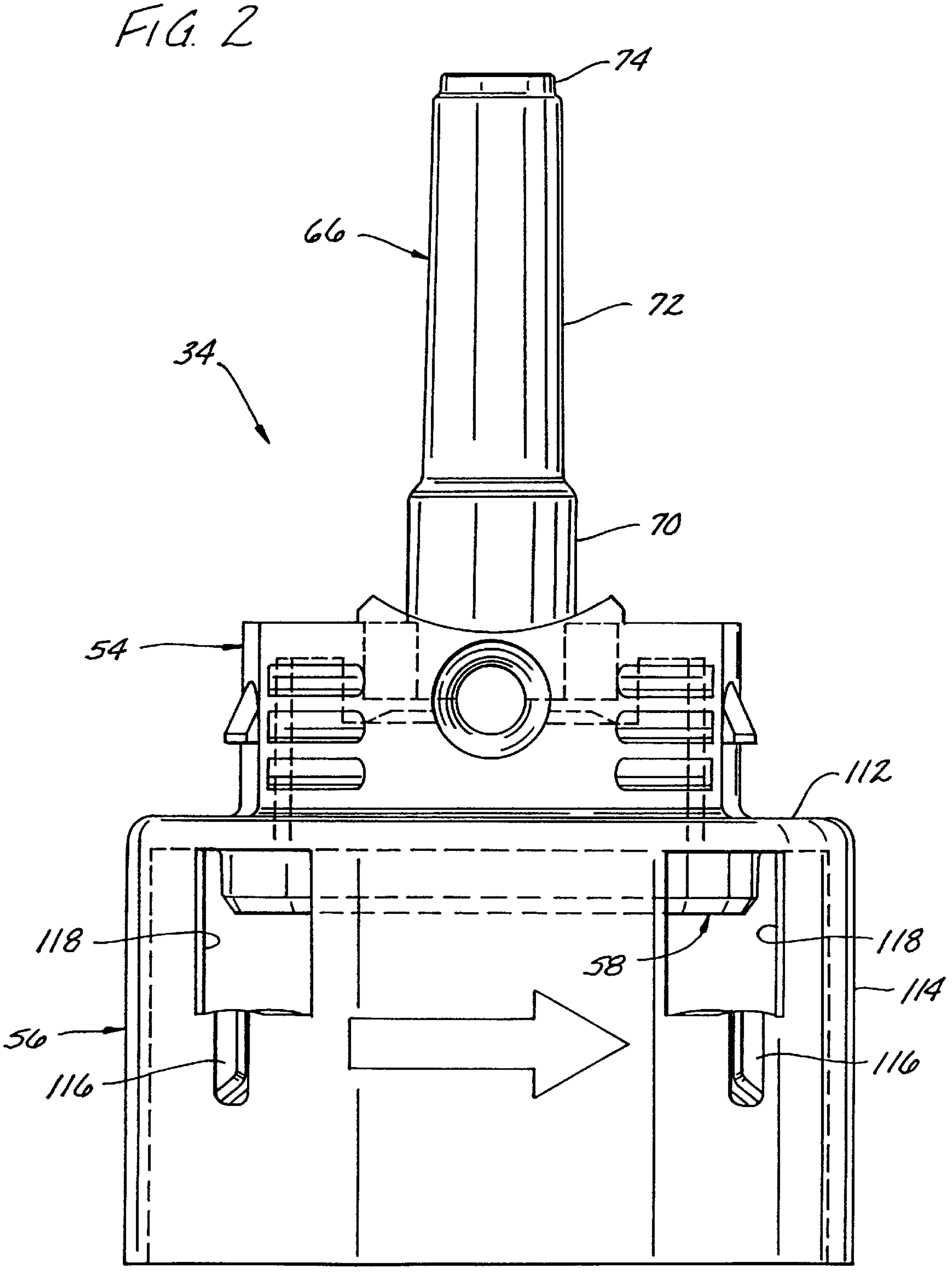
FIG. 2 is a front elevational view of a lower member of the trigger sprayer of FIG. 1.
Figure 3:
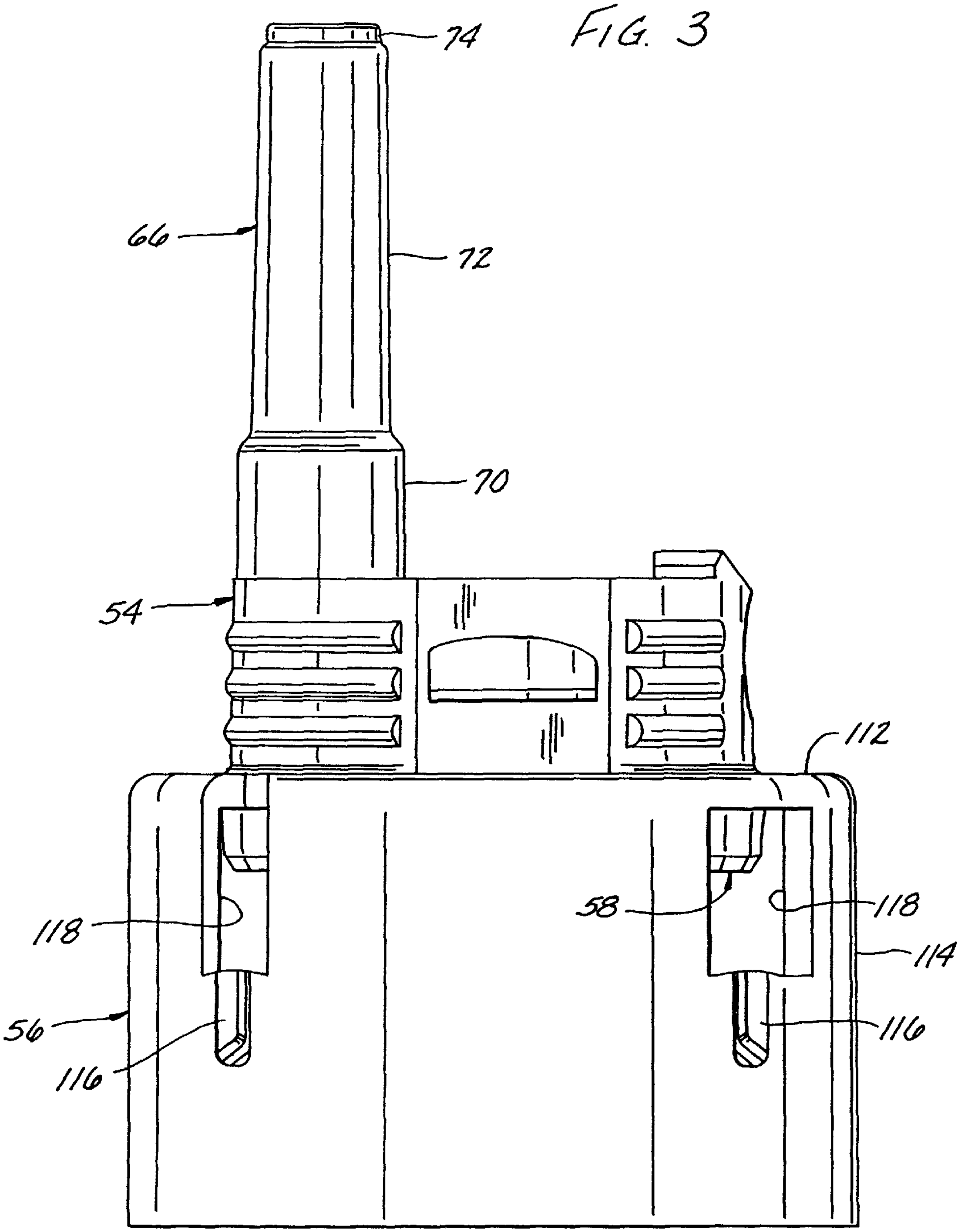
FIG. 3 is a side elevational view of the lower member of FIG. 2.
Figure 4:
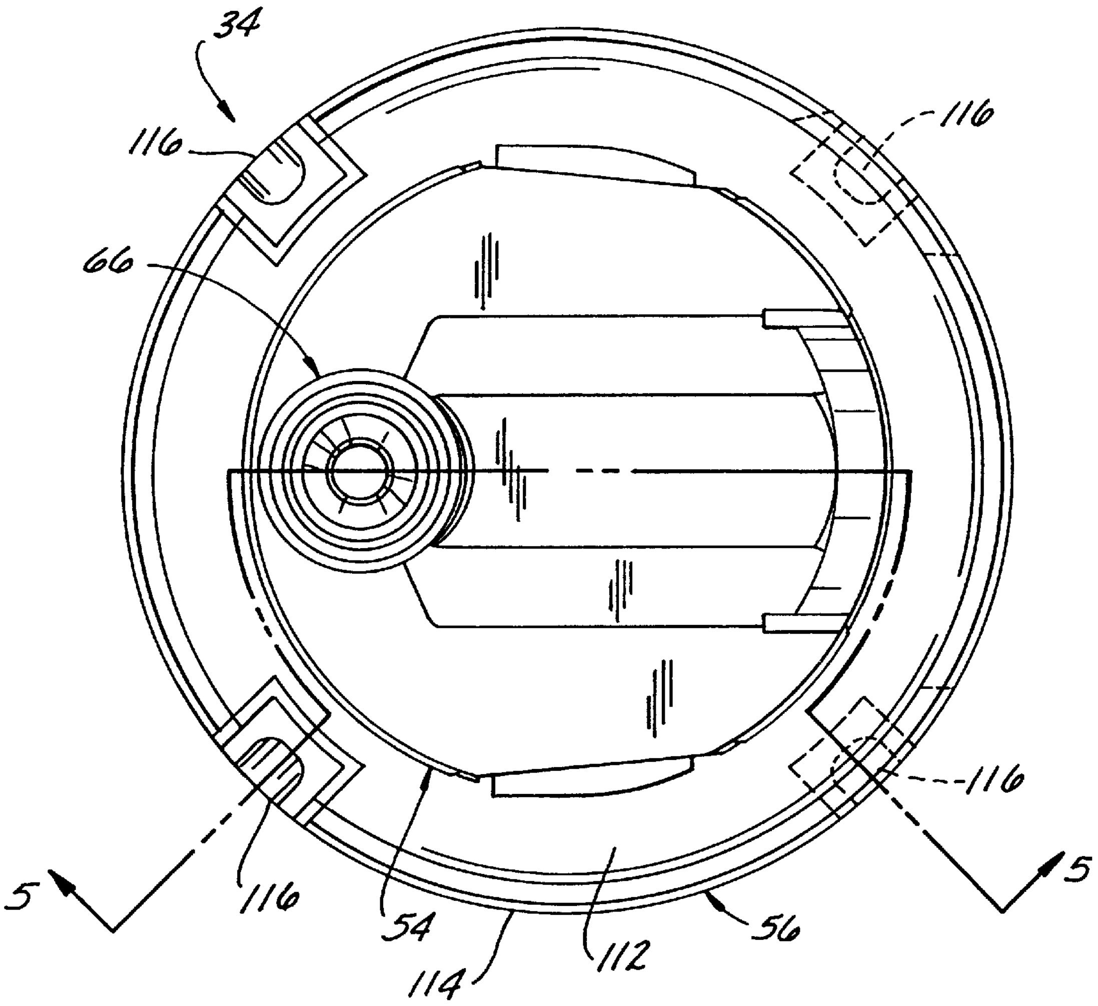
FIG. 4 is a top plan view of the lower member of FIG. 2.
Figure 5:
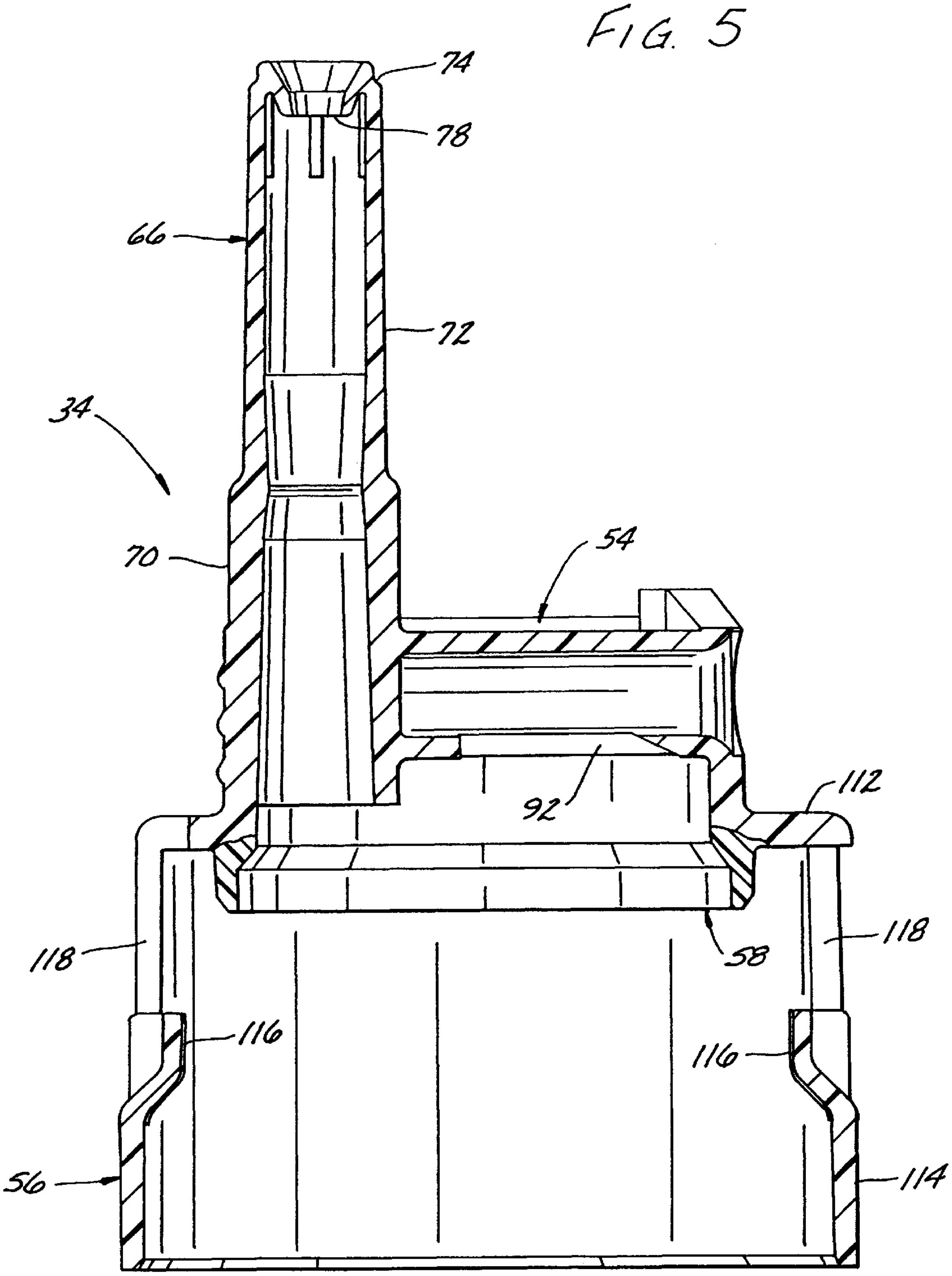
FIG. 5 is a section view taken along the plane of line 5—5 of FIG. 4.

Referring now to the drawings, and first more particularly to FIG. 1, a trigger sprayer of the present invention is indicated in its entirety by the reference numeral 20. Preferably, the trigger sprayer 20 includes: (1) an upper housing member, generally indicated at 22; (2) a plunger, generally indicated at 24, (3) a coil spring 26; (4) a trigger 28; (5) a nozzle assembly, generally indicated at 30; (6) a spinner assembly, generally indicated at 32; (7) a lower member, generally indicated at 34; and (8) a dip tube 36. The upper housing member 22 and plunger 24 constitute a dispenser body.

The upper housing member 22 is preferably a single unitary piece and includes a cylindric wall 38, a circular back wall 40 substantially closing one end (i.e., the right end as viewed in FIG. 1) of the cylindric wall, a generally cylindric vertical formation 42 adjacent the circular back wall, and a horizontal tubular portion 44 extending forward from the vertical formation. The cylindric wall 38 includes a generally cylindric inner surface 46. The cylindric inner surface 46 of the cylindric wall 38 and the circular back wall 40 define a pump chamber, generally indicated at 48 open at one end (i.e., its left end as viewed in FIG. 1) for slidably receiving a piston head 50 of the plunger 24. The pump chamber 48, piston head 50, and spring 26 constitute components of a pump mechanism, generally indicated at 52.

The lower member 34 is a molded, one piece member and includes a lower housing portion 54, a closure cap portion 56, and a seal portion 58. The closure cap portion 56 is shaped for connection to a container, such as a bottle 60 having a neck 62 and a mouth 64 in the neck for passage therethrough of liquid in the bottle. The closure cap portion 56 and bottle neck 62 is discussed in greater detail below. The seal portion 58 preferably has the shape of an annular lip sized for extending into the bottle mouth 64 and for sealingly engaging the inner circumference of the bottle neck 62. As discussed in greater detail below, although the lower member 34 comprises a single molded piece, the seal portion 58 is of a different and softer material than that of the rest of the lower member to provide a fluid tight seal between the lower member and the bottle 60.

The lower housing portion 54 includes a tubular portion 66 extending upwardly into a vertical bore 68 of the vertical formation 42 of the upper housing member 22. Preferably, the tubular portion 66 has a lower region 70, an intermediate region 72, and an upper region 74. The lower region 70 of the lower housing tubular portion 66 is sized for a snug fit in the vertical bore 68 of the vertical formation 42 to provide a fluid tight seal therebetween. The intermediate region 72 has an outer diameter which is less than the inner diameter of the housing vertical bore 68. The outer surface of the intermediate region 72 and the surface of the housing vertical bore 68 define an annular fluid passage therebetween. Preferably, the inside diameter of the lower and intermediate regions 70, 72 of the lower member tubular portion 66 are sized for a snug fit of the upper portion of the dip tube 36.

The upper region 74 of the lower member tubular portion 66 includes a check-valve seat 78. The check-valve seat 78 defines an intake port (also referred to by reference number 78) of the trigger sprayer 20. The intake port 78 is in fluid communication with liquid (not shown) contained in the bottle 60 via the dip tube 36.

The upper housing member 22 further includes a lateral opening 80 extending through its circular back wall 40. Preferably, the lateral opening 80 is aligned with the intermediate region 72 of the lower member tubular portion 66 for providing fluid communication between the pump chamber 48 and the annular fluid passage. The upper region 74 of the lower member tubular portion 66, the annular fluid passage, and the lateral opening 80 define an intake liquid flow path providing fluid communication between the intake port 78 and the pump mechanism 52.

The check-valve seat 78 is shaped and configured for receiving a ball 84. The check-valve seat 78 and ball 84 constitute a priming check valve 88 in the intake liquid flow path for permitting fluid flow from the intake port 78 to the pump mechanism 52 and for checking fluid flow from the pump mechanism to the intake port. The ball 84 constitutes a moveable valve member of the priming check valve 88.

The plunger 24 further includes a plug 94 integrally connected to and moveable with the piston head 50. The plug 94 is adapted for closing a bottle vent opening 92 through the closure cap portion 56 of the lower member 34 when the trigger sprayer 20 is not in use, to prevent liquid from spilling out of the bottle via the opening.

The horizontal tubular portion 44 of the upper housing member 22 includes a horizontal bore 96 extending horizontally between a rear portion and a forward end (left end as viewed in FIG. 1) of the upper housing member. The nozzle assembly 30 includes a tubular projection 98 inserted into the horizontal bore 96 via the forward (downstream) end of the bore, a nozzle wall 100 at a forward end of the nozzle tubular projection, and a nozzle orifice 102 through the nozzle wall and in fluid communication with the interior of the bore. The annular fluid passage, the horizontal bore 96, and the interior of the nozzle tubular projection 98 constitute a discharge liquid flow path. The nozzle orifice 102 constitutes a discharge port (also referred to via reference numeral 102) of the discharge liquid flow path. Dispensed liquid flows from the pump chamber 48, through the lateral opening 80, upward through the annular fluid passage, forward through the horizontal bore 96, and then out through the discharge port 102.

The spinner assembly 32 is positioned in the upper housing member's horizontal bore 96 and is held in place by the nozzle tubular projection 98. The spinner assembly 32 includes a resilient disc 104 at its rearward end (right end as viewed in FIG. 1). The resilient disc 104 is engageable with an annular shoulder 106 formed in the upper housing member 22 at the rear end of the horizontal bore 96. The resilient disc 104 and the annular shoulder 106 constitute a discharge check valve, generally indicated at 108, in the discharge liquid flow path for permitting fluid flow from the pump mechanism 52 to the nozzle discharge port 102 and for checking fluid flow from the discharge port 102 to the pump mechanism. In particular, the resilient disc 104 of the spinner assembly 32 constitutes a moveable valve member of the discharge check valve 108 and the annular shoulder 106 of the upper housing member 22 constitutes a valve seat of the discharge check valve. The resilient disc 104 is moveable between a closed position and an open position. In its closed (or seated) position, the resilient disc 104 sealing engages the annular shoulder 106 all around the shoulder to prevent passage of liquid therethrough. In its open (unseated) position, at least a part of the resilient disc 104 flexes forwardly away from the annular shoulder 106 to thereby provide a gap between the resilient disc and the shoulder to allow liquid to flow therethrough.

The piston head 50 of the plunger 24 is preferably formed of a suitable resilient material such as low density polyethylene. The piston head 50 comprises the rearward end (the right most end as viewed in FIG. 1) of the plunger 24. The piston head 50 is slidable within the pump chamber 48 and configured for sealing engagement with the cylindric inner surface 46 of the pump chamber 48 all around the piston head 50 to seal against leakage of fluid between the plunger 24 and cylindric inner surface 46 of the upper housing member 22. The piston head 50 and pump chamber 48 define a variable volume fluid receiving cavity 110. The piston head so is reciprocally slidable in the pump chamber 48 between a forward (extended) position and a rearward (compressed) position. The plunger 24 is manually moved from its extended position to its compressed position by depressing the trigger 28. The coil spring 26 is positioned between the circular back wall 40 of the pump chamber 48 and the plunger 24 for urging the plunger forward to its extended position. Thus, the plunger 24 is rearwardly moved from its extended position to its compressed position by manually squeezing the trigger 28, and is automatically returned to its extended position via the piston spring 26 when the operator releases the trigger.

Referring now to FIGS. 2–5, the closure cap portion 56 includes a disc-shaped portion 112 and an annular skirt 114 circumscribing and depending down from the disc-shaped portion. The annular skirt is sized and configured for engaging the outer surface of the neck 62 of the bottle 60. The seal portion 58 depends downwardly from the disc-shaped portion 112. It is circumscribed by and spaced radially inwardly of the annular skirt 114. The seal portion 58 is shaped for sealingly engaging the inner surface of the bottle's neck 62 all around such inner surface when the skirt is secured to the outer surface of the bottle's neck. At least three (and preferably four) lugs extend generally radially inwardly from an inner surface of the skirt. Preferably, the lugs are circumferentially spaced substantially equally along the inside surface of the skirt. For example, if the closure cap has four lugs, then the lugs are spaced generally at 90° intervals; if the closure cap has three lugs, then the lugs are spaced generally at 120° intervals. The lugs 116 are positioned generally below a like number of openings or windows 118 through the annular skirt 114 for extraction of mold parts during the molding process of the lower member 34.

As mentioned above, the seal portion 58 of the lower member 34 is of a softer material than that of the rest of the lower member. The lower housing portion 54 and the closure cap portion 56 of the lower member 34 are preferably made of a relatively rigid polymeric material such as polypropylene. The seal portion 58 is of a material having a durometer hardness reading less than that of the upper housing member. Preferably, the seal portion 58 is of resilient, flexible polymeric material such as Santoprene®, commercially available from Monsanto Company, St. Louis, Miss., or a low density polyethylene (LDPE). Because the seal portion 58 is of a flexible, resilient material, the seal portion readily conforms to the shape of the inner surface of the bottle's neck 62 to provide a fluid tight seal.

The lower member 34 is of a one-piece molded construction. Molding techniques and methods are well known to those of ordinary skill in the art in trigger sprayer manufacturing. To make the lower member 34, a first liquid polymeric material (e.g., Santoprene® or LDPE) is injected via conventional methods into a first portion of a mold. This first portion of the mold is shaped to form the seal portion of the lower member. A second liquid polymeric material (e.g., polypropylene) is injected into a second portion of the mold. The second portion of the mold is shaped to form the housing portion of the lower member. This second liquid material may be injected into the mold before, after, or simultaneously with injection of the first liquid material. Preferably the mold is shaped and configured so that part of the first material interfaces with (i.e., contacts) part of the second material in the mold. The first and second materials are then allowed to solidify in the mold to form a solid one piece member constituting the lower member 34. The lower member is then removed from the mold. The first material cooperates with the second material to maintain securement of the seal portion to the housing portion.

Figure 6:
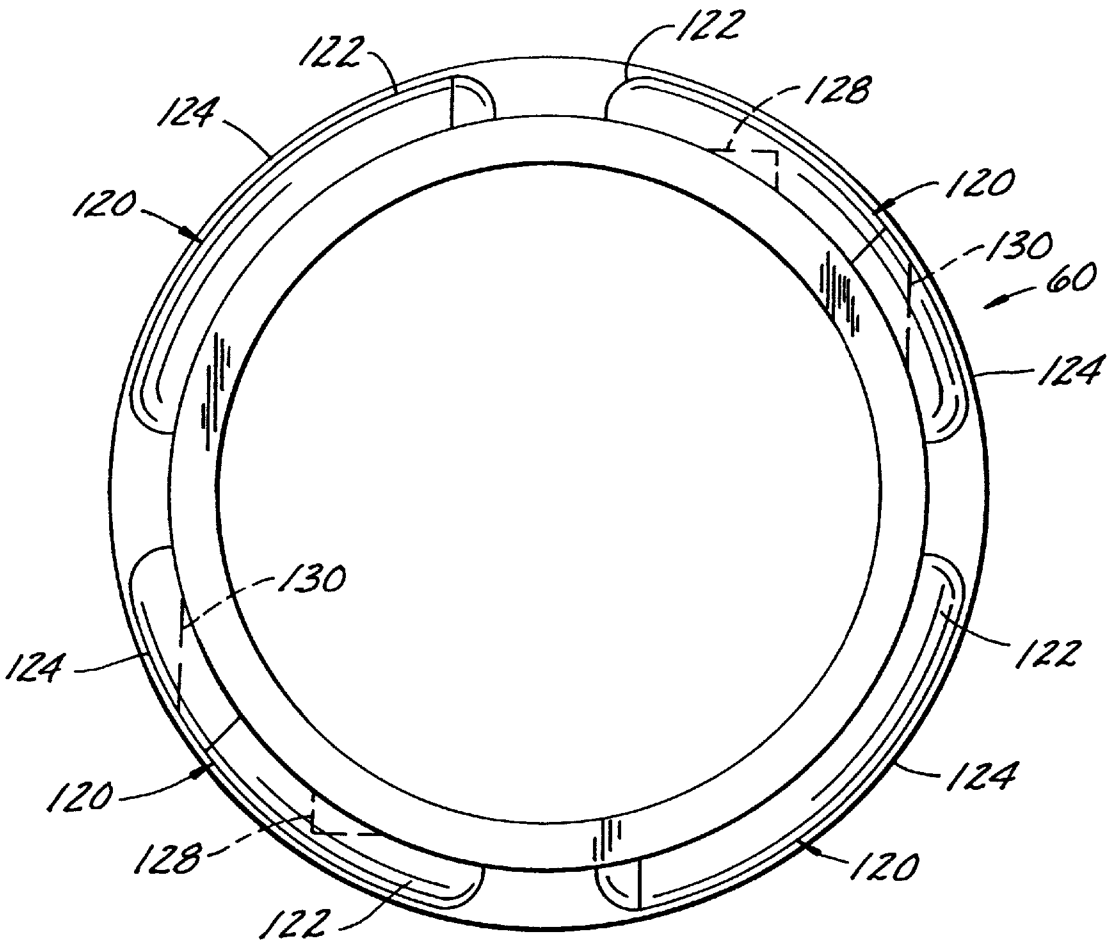
FIG. 6 is a top plan view of the bottle finish of the bottle of FIG. 1.
Figure 7:
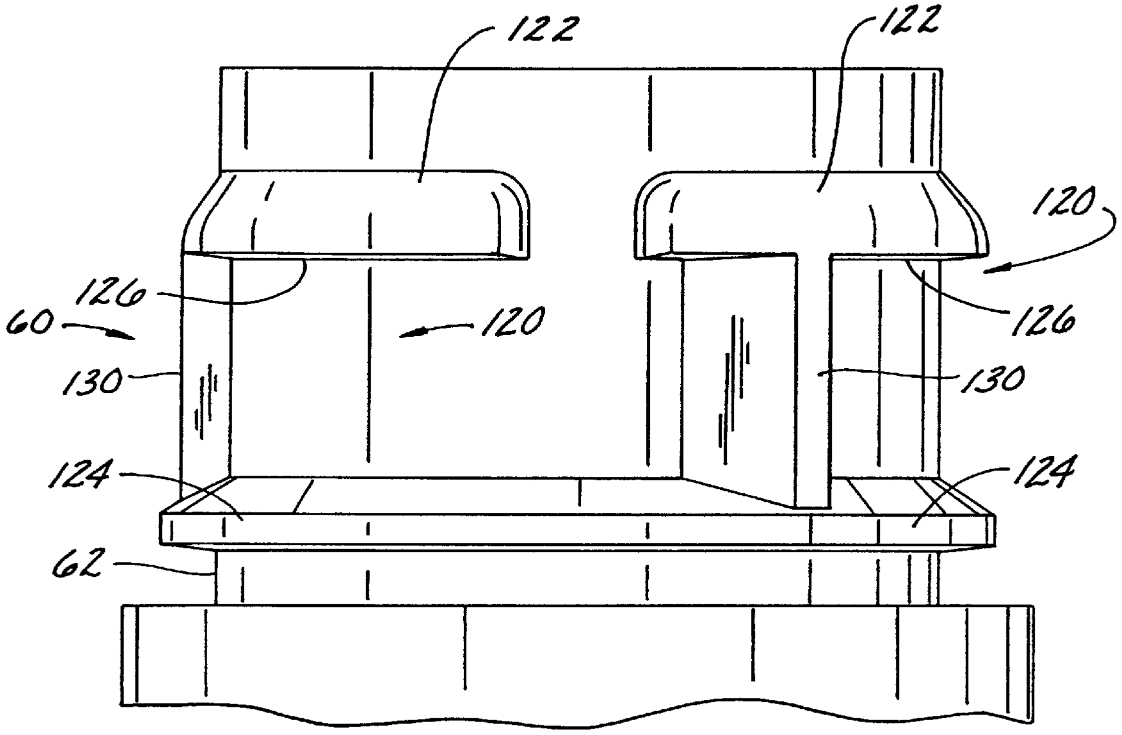
FIG. 7 is a side elevational view of the bottle finish of FIG. 6.
Figure 8:
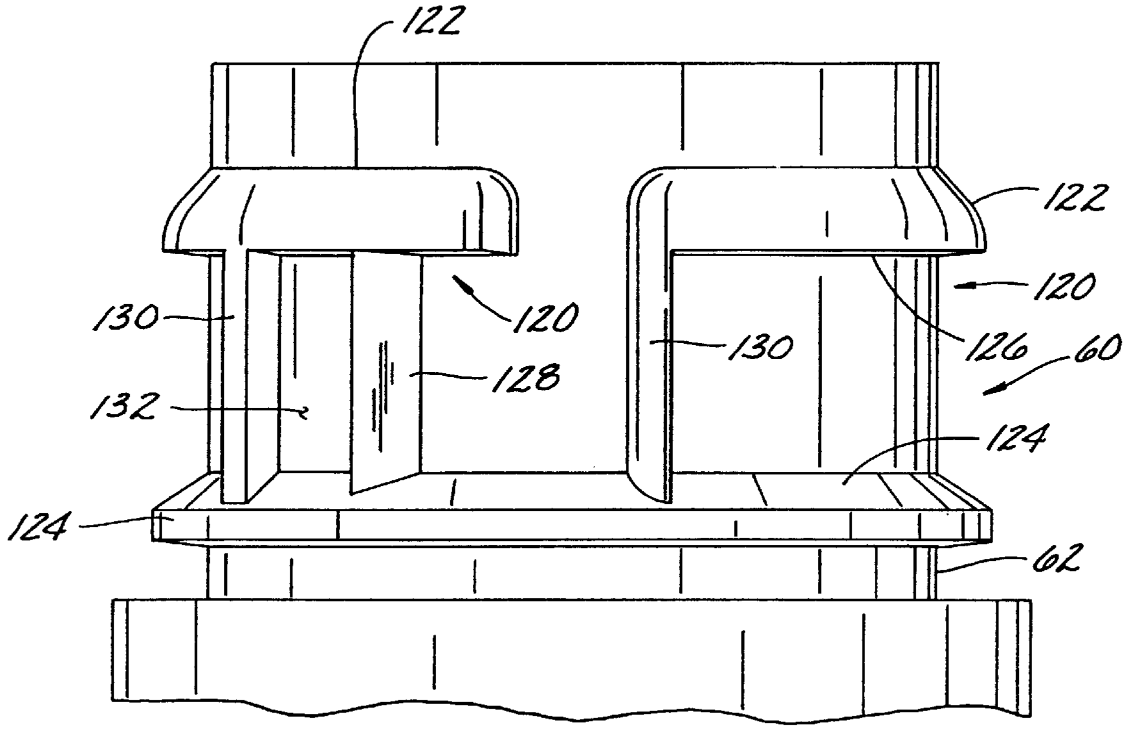
FIG. 8 is a front elevational view of the bottle finish of FIG. 6.

Referring now to FIGS. 6–8, the bottle 60 further includes at least three bayonet provisions, generally indicated at 120, on the outer surface of the bottle's neck 62. Preferably, the bottle 60 has one bayonet provision 120 for each lug 116 of the closure cap portion. Thus, if the closure cap portion 56 has four lugs 116, then the bottle 60 has four bayonet provisions 120. Preferably, the bayonet provisions 120 are circumferentially spaced substantially equally along the outer surface of the bottle's neck 62. The bayonet provisions 120 are shaped and configured to mate with the lugs 116 to releasably lock the skirt 114 of the closure cap portion 56 to the bottle's neck 62. Each bayonet provision 120 includes upper (first) and lower (second) arcuate rib portions 122, 124 which are generally vertically spaced to define a lug-receiving channel 126 therebetween. First and second vertical rib portions 128, 130 extend between the upper and lower arcuate rib portions 122, 124 of two diametrically opposite bayonet provisions and are circumferentially spaced to define a lug holding recess 132 (FIG. 8) of the lug-receiving channel 126. The rib portions 122, 124, 128, 130 are configured to engage the lugs 116 of the closure cap portion 56 when the lugs are received in the lug holding recesses 132 to thereby resist circumferential and vertical movement of the closure cap portion relative to the bottle's neck 62.

Because of the bayonet provisions 120 and the lugs 116, the closure cap portion 56 can be snap fit onto the bottle's neck 62 in one of two ways. In the first way, the closure cap portion 56 is merely pressed downwardly onto the bottle's neck 62. The upper arcuate rib portions 122 preferably have inclined (i.e., wedge shaped) upper surfaces. When the closure cap portion 56 is pressed downwardly onto the bottle's neck 62, the lugs 116 press against the inclined upper surfaces of the upper rib portions 122 to force the upper rib portions 122 radially inwardly until the lugs move downwardly into the lug holding recesses 132. The upper rib portions 122 then snap back into their original position and help retain the lugs 116 in the lug holding recesses 132. Alternatively, the lugs 116 are aligned with gaps between adjacent upper rib portions 122 and the closure cap portion 56 is moved downwardly on the bottle's neck 62 until the lugs are in the lug receiving channels 126. The closure cap portion 56 is then rotated about 45° until the lugs 116 are positioned laterally between the first and second vertical rib portions 128, 130. The vertical rib portions 128, 130 resist rotational movement of the closure cap portion 56 relative to the bottle 60 and the arcuate rib portions 122, 124 resist vertical movement of the closure cap portion relative to the bottle.

Because the closure cap portion 56 has at least three lugs 116 which releasably engage a like number of bayonet provisions 120, the closure cap portion resists rocking and maintains the seal portion 58 in sealing engagement with the bottle.

Although the preferred embodiment has been described as a trigger sprayer, it is to be understood that other pump-type dispensers (e.g., lotion dispensers, etc.) are also encompassed by this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of making a one-piece lower member of a manually operated reciprocating fluid pump adapted to be secured to a container's mouth, the lower member being configured to be connected to a dispenser body of the fluid pump, the dispenser body having a pump mechanism, a discharge port, and a discharge liquid flow path providing fluid communication between the pump mechanism and discharge port, the lower member comprising a housing portion and a seal portion, the housing portion having an intake port adapted for fluid communication with liquid contained in the container, the housing portion at least in part defining an intake liquid flow path providing fluid communication between the intake port and the pump mechanism when the lower member is connected to the dispenser body, the seal portion being engageable with the container and shaped and configured for providing a fluid-tight seal between the lower member and the mouth of the container, the method comprising:

injecting a first liquid polymeric material into a first portion of a mold, the first portion of the mold being shaped to form the seal portion of the lower member;

injecting a second liquid polymeric material into a second portion of the mold, the second portion of the mold being shaped to form the housing portion of the lower member, the first and second polymeric materials having different compositions, part of the first material interfacing with part of the second material in the mold;

allowing the first and second materials to solidify in the mold to form a solid one piece member constituting the lower member; and removing the solid one piece member from the mold.

2. A method as set forth in claim 1 wherein, after the first and second materials have solidified, the second material has a greater hardness than that of the first material.

3. A method as set forth in claim 2 wherein the housing portion includes a closure cap portion, and said closure cap portion comprises a generally annular-shaped skirt and at least three lugs extending generally radially inwardly from an inside surface of the skirt.

4. A method as set forth in claim 3 wherein the skirt of the closure cap portion circumscribes and is spaced radially from the seal portion.

* * * * *